US010863080B2

(12) United States Patent
Lee et al.

(10) Patent No.: US 10,863,080 B2
(45) Date of Patent: *Dec. 8, 2020

(54) MOBILE TERMINAL AND METHOD FOR CONTROLLING THE SAME

(71) Applicant: LG ELECTRONICS INC., Seoul (KR)

(72) Inventors: Hoyoun Lee, Seoul (KR); Woongil Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/849,300

(22) Filed: Apr. 15, 2020

(65) Prior Publication Data

US 2020/0244870 A1 Jul. 30, 2020

Related U.S. Application Data

(63) Continuation of application No. 16/432,635, filed on Jun. 5, 2019, now Pat. No. 10,659,678, which is a (Continued)

(30) Foreign Application Priority Data

May 13, 2014 (KR) .................. 10-2014-0057095

(51) Int. Cl.
*H04N 5/222* (2006.01)
*H04N 5/232* (2006.01)
(Continued)

(52) U.S. Cl.
CPC ....... *H04N 5/23216* (2013.01); *G06F 3/0482* (2013.01); *G06F 3/0488* (2013.01);
(Continued)

(58) Field of Classification Search
CPC ......... H04N 5/23293; H04N 5/232935; H04N 1/00408; H04N 1/00411; H04N 1/00416;
(Continued)

(56) References Cited

U.S. PATENT DOCUMENTS 10,419,660 B2  9/2019  Lee et al.
10,659,678 B2  5/2020  Lee et al.
(Continued)

FOREIGN PATENT DOCUMENTS

CN   1788485    6/2006
CN   101794203  8/2010
(Continued)

OTHER PUBLICATIONS

PCT International Application No. PCT/KR2015/000962, Written Opinion of the International Searching Authority dated Apr. 20, 2015, 11 pages.

(Continued)

*Primary Examiner* — Kelly L Jerabek
(74) *Attorney, Agent, or Firm* — Lee, Hong, Degerman, Kang & Waimey PC

(57) ABSTRACT

Disclosed is a mobile terminal, by which an image can be easily attached. In particular, the present invention includes a $1^{st}$ camera, a touchscreen, and a controller controlling the touchscreen to output a running screen of a prescribed application and a preview screen of the $1^{st}$ camera to a $1^{st}$ region and a $2^{nd}$ region on the touchscreen, respectively, the controller, if a photograph command is received, attaching an image data photographed through the $1^{st}$ camera to the prescribed application, wherein a data size of the attached image data is based on a size of the $2^{nd}$ region.

20 Claims, 13 Drawing Sheets

Related U.S. Application Data continuation of application No. 15/913,746, filed on Mar. 6, 2018, now Pat. No. 10,419,660, which is a continuation of application No. 15/462,691, filed on Mar. 17, 2017, now Pat. No. 9,942,469, which is a continuation of application No. 14/648,169, filed as application No. PCT/KR2015/000962 on Jan. 29, 2015, now Pat. No. 9,621,792.

(51) Int. Cl.
*H04L 12/58* (2006.01)
*G06F 3/0488* (2013.01)
*G06F 3/0484* (2013.01)
*H04M 1/00* (2006.01)
*H04N 1/00* (2006.01)
*H04M 1/725* (2006.01)
*G06F 3/0481* (2013.01)
*G06F 3/0482* (2013.01)
*H04N 5/225* (2006.01)
*H04N 5/262* (2006.01)

(52) U.S. Cl.
CPC ...... *G06F 3/04817* (2013.01); *G06F 3/04845* (2013.01); *G06F 3/04883* (2013.01); *H04L 51/08* (2013.01); *H04L 51/32* (2013.01); *H04M 1/00* (2013.01); *H04M 1/72555* (2013.01); *H04M 1/72583* (2013.01); *H04N 1/0044* (2013.01); *H04N 1/00307* (2013.01); *H04N 1/00424* (2013.01); *H04N 1/00445* (2013.01); *H04N 1/00469* (2013.01); *H04N 1/00472* (2013.01); *H04N 5/2258* (2013.01); *H04N 5/23293* (2013.01); *H04N 5/2628* (2013.01); *H04M 2250/52* (2013.01); *H04N 2201/0084* (2013.01); *H04N 2201/0089* (2013.01); *H04N 2201/0096* (2013.01)

(58) Field of Classification Search
CPC ................ H04N 1/00442; G03B 13/02; G03B 2213/00; G03B 2213/02
See application file for complete search history.

(56) References Cited

U.S. PATENT DOCUMENTS

| | | | |
|---|---|---|---|
| 2005/0146631 A1 | 7/2005 | Shelton et al. | |
| 2006/0098112 A1* | 5/2006 | Kelly | H04N 5/2351 |
| | | | 348/333.12 |
| 2007/0174489 A1 | 7/2007 | Iwabuchi | |
| 2010/0020221 A1 | 1/2010 | Tupman et al. | |
| 2010/0053342 A1 | 3/2010 | Hwang et al. | |
| 2010/0321536 A1 | 12/2010 | Lee et al. | |
| 2012/0243043 A1 | 9/2012 | Asai | |
| 2013/0311920 A1 | 11/2013 | Koo et al. | |
| 2013/0314580 A1 | 11/2013 | Ju et al. | |
| 2014/0085487 A1 | 3/2014 | Park et al. | |
| 2014/0118600 A1 | 5/2014 | Son et al. | |
| 2015/0067513 A1 | 3/2015 | Lambetti et al. | |
| 2015/0103002 A1 | 4/2015 | Yoon et al. | |
| 2015/0278207 A1 | 10/2015 | Seo et al. | |
| 2016/0261790 A1 | 9/2016 | Lee et al. | |
| 2017/0195555 A1 | 7/2017 | Lee et al. | |
| 2018/0198974 A1 | 7/2018 | Lee et al. | |

FOREIGN PATENT DOCUMENTS

| | | |
|---|---|---|
| CN | 102340594 | 2/2012 |
| CN | 102447779 | 5/2012 |
| CN | 103595909 | 2/2014 |
| CN | 103685724 | 3/2014 |
| CN | 103685729 | 3/2014 |
| EP | 26694983 | 11/2013 |
| KR | 10-2010-0137618 | 12/2010 |
| KR | 10-2012-0009581 | 2/2012 |
| KR | 10-2012-0089919 | 8/2012 |
| KR | 10-2013-0109466 | 10/2013 |
| KR | 10-20140038759 | 3/2014 |
| KR | 10-2014-0039737 | 4/2014 |

OTHER PUBLICATIONS

Korean Intellectual Property Office Application No. 10-2014-0057095, Office Action dated Jul. 18, 2019, 6 pages.
The State Intellectual Property Office of the People's Republic of China Application Serial No. 201810796868.5, Office Action dated Mar. 27, 2020, 10 pages.
State Intellectual Property Office of the People's Republic of China Application Serial No. 201580000191.4, Office Action dated May 24, 2017, 18 pages.
European Patent Office Application Serial No. 15753305.0, Office Action dated Jun. 6, 2018, 7 pages.
European Patent Office Application Serial No. 15753305.0, Search Report dated Jun. 8, 2016, 7 pages.
U.S. Appl. No. 15/462,691, Office Action dated Aug. 9, 2017, 26 pages.

* cited by examiner

FIG. 4
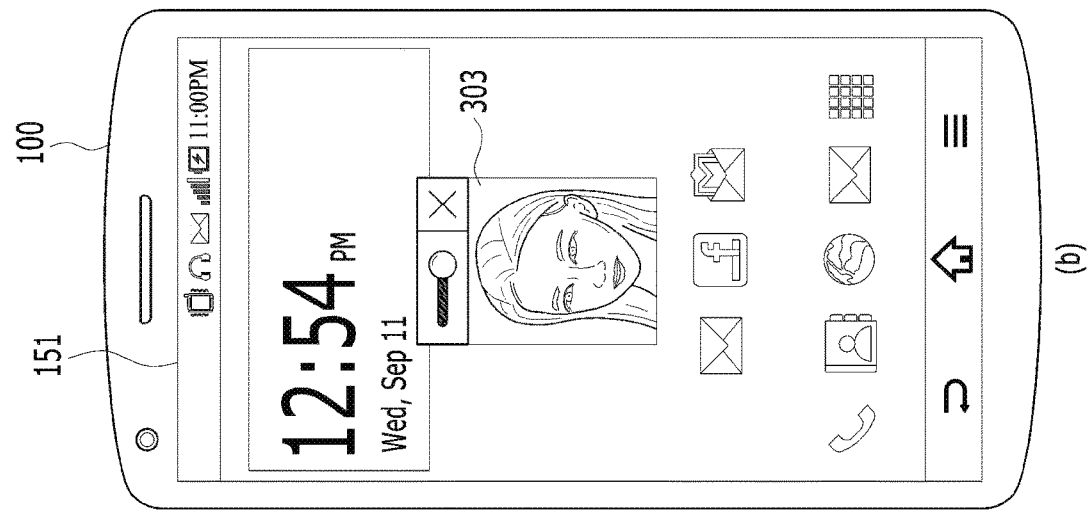
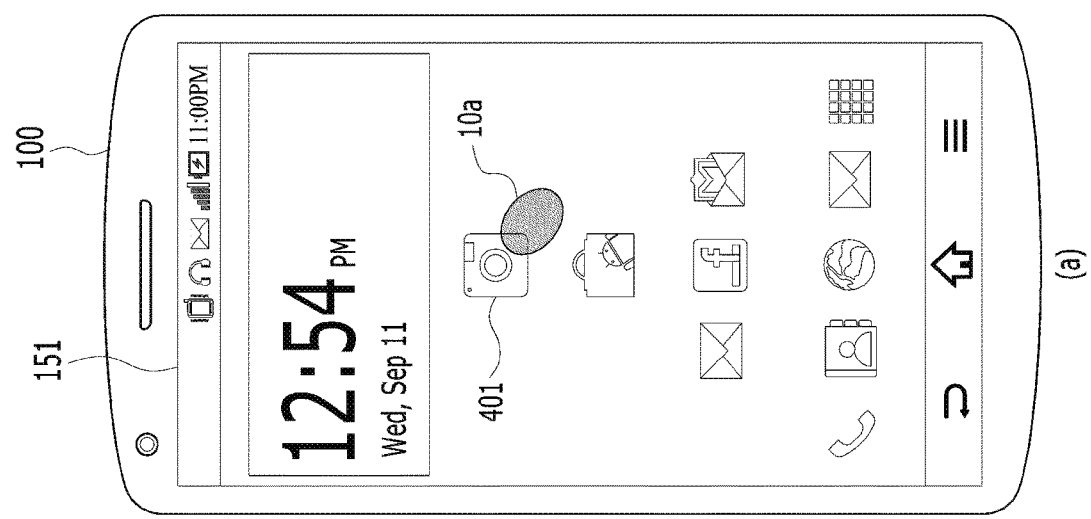

FIG. 10
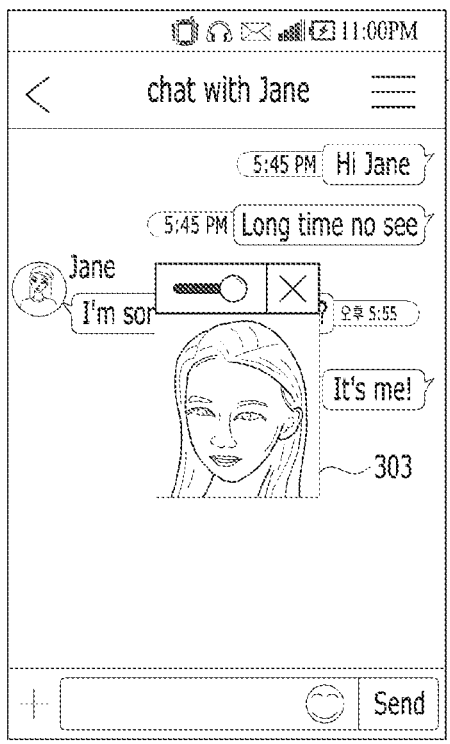
(a)
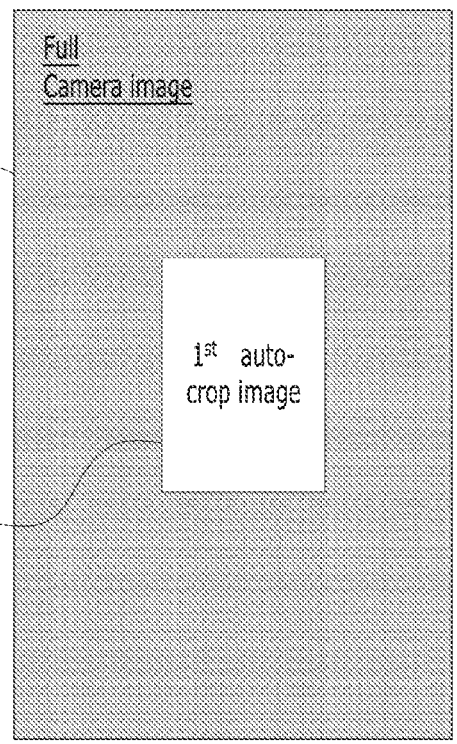
(b)
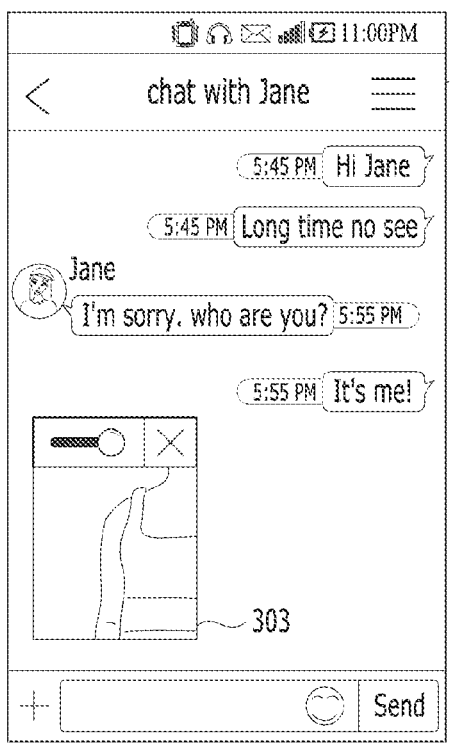
(c)
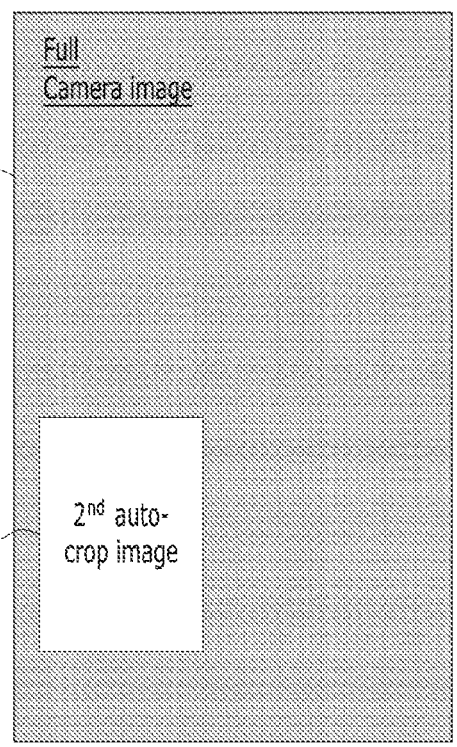
(d)

MOBILE TERMINAL AND METHOD FOR CONTROLLING THE SAME

CROSS-REFERENCE TO RELATED APPLICATIONS

This application is a continuation of U.S. patent application Ser. No. 16/432,635, filed on Jun. 5, 2019, now U.S. Pat. No. 10,659,678, which is a continuation of U.S. patent application Ser. No. 15/913,746, filed on Mar. 6, 2018, now U.S. Pat. No. 10,419,660, which is a continuation of U.S. patent application Ser. No. 15/462,691, filed on Mar. 17, 2017, now U.S. Pat. No. 9,942,469, which is a continuation of U.S. patent application Ser. No. 14/648,169, filed on May 28, 2015, now U.S. Pat. No. 9,621,792, which is a National Stage filing under 35 U.S.C. 371 of International Application No. PCT/KR2015/000962, filed on Jan. 29, 2015, which claims the benefit of earlier filing date and right of priority to Korean Application No. 10-2014-0057095, filed on May 13, 2014, the contents of which are all hereby incorporated byreference herein in their entirety.

TECHNICAL FIELD

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

BACKGROUND ART

Generally, terminals can be classified into mobile/portable terminals and stationary terminals. The mobile terminals can be further classified into handheld terminals and vehicle mount terminals according to possibility of user's direct portability.

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, as many mobile terminals are released as smartphones, an online community of a new type called SNS (social network service) is established. Users of the online community perform social intercourse and information sharing through mutual exchange of various multimedia contents as well as exchange of simple text data. A multimedia content desired to be changed may include a previously saved content or a content instantly photographed through a camera provided to a mobile terminal. Thus, in forming a content instantly using a camera and then transmitting the formed content, the demand for a convenience-enhanced control method is rising.

DISCLOSURE OF THE INVENTION

Technical Task

Accordingly, the present invention is directed to a mobile terminal and controlling method thereof that substantially obviate one or more problems due to limitations and disadvantages of the related art. And, the technical task of the present invention is to provide a mobile terminal and controlling method thereof, by which a size of instantly photographed image data can be easily controlled.

Technical Solutions

In one technical aspect of the present invention, provided herein is a mobile terminal, including a $1^{st}$ camera, a touchscreen, and a controller controlling the touchscreen to output a running screen of a prescribed application and a preview screen of the $1^{st}$ camera to a $1^{st}$ region and a $2^{nd}$ region on the touchscreen, respectively, the controller, if a photograph command is received, attaching an image data photographed through the $1^{st}$ camera to the prescribed application, wherein a data size of the attached image data is based on a size of the $2^{nd}$ region.

In another technical aspect of the present invention, provided herein is a method of controlling a mobile terminal, including the steps of controlling a touchscreen to output a running screen of a prescribed application and a preview screen of a $1^{st}$ camera to a $1^{st}$ region and a $2^{nd}$ region on the touchscreen, respectively and if a photograph command is received, attaching an image data photographed through the $1^{st}$ camera to the prescribed application, wherein a data size of the attached image data is based on a size of the $2^{nd}$ region.

Advantageous Effects

Accordingly, a mobile terminal and controlling method thereof according to the present invention provide the following effects and/or features.

According to at least one of embodiments of the present invention, a multimedia content can be transmitted easily.

According to at least one of embodiments of the present invention, if a transmitted multimedia content is an image instantly photographed through a camera, a size of a photographed image data can be easily controlled.

The additional scope of applicability of the present invention can become obvious from the detailed description in the following. Yet, since it will be apparent to those skilled in the art that various modifications and variations can be made therein without departing from the spirit and scope of the invention., the detailed description and a specific embodiment such as a preferred embodiment of the present invention should be understood as taken as one example only.

DESCRIPTION OF DRAWINGS

The present invention will become more fully understood from the detailed description given herein below and the accompanying drawings, which are given by illustration only, and thus are not limitative of the present invention, and wherein.

FIG. 4 and FIG. 5 are diagrams for examples of a user command for outputting a camera preview popup window 303 according to one embodiment of the present invention;

FIG. 10 is a diagram for a control method of performing an auto-crop operation based on a location and/or size of a preview popup window 303 according to one embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
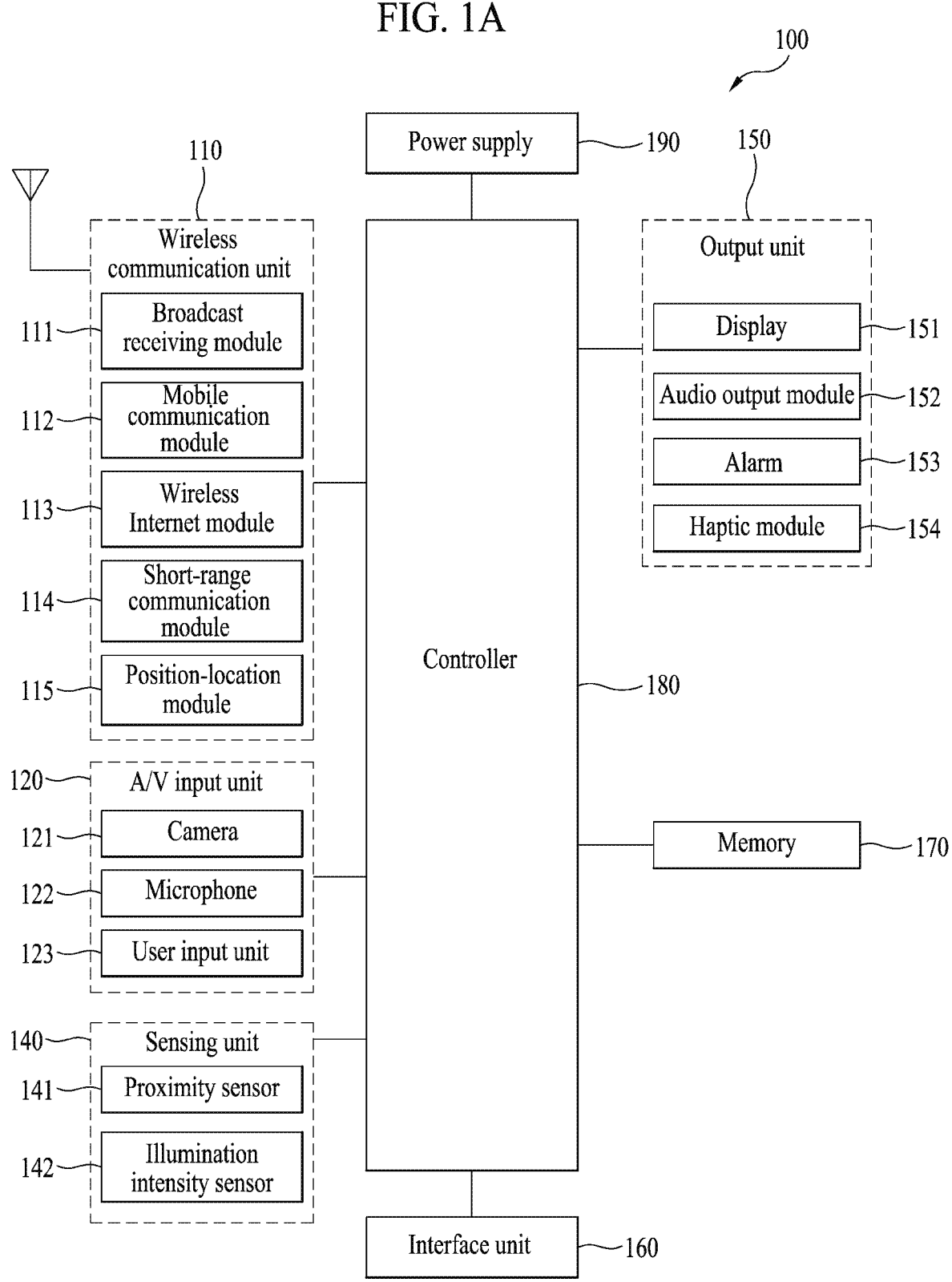
FIG. 1A is a block diagram of a mobile terminal in accordance with the present disclosure.
Figure 1B:
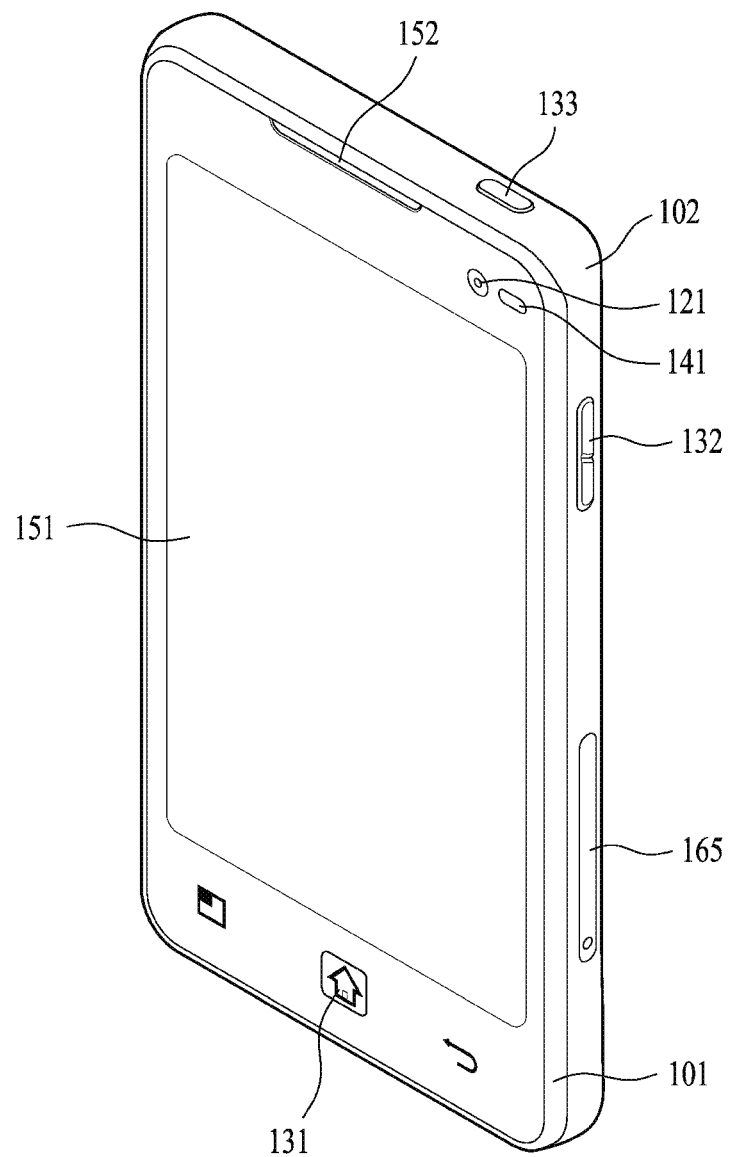
FIGS. 1B and 1C are conceptual views of one example of the mobile terminal, viewed from different directions.
Figure 1C:
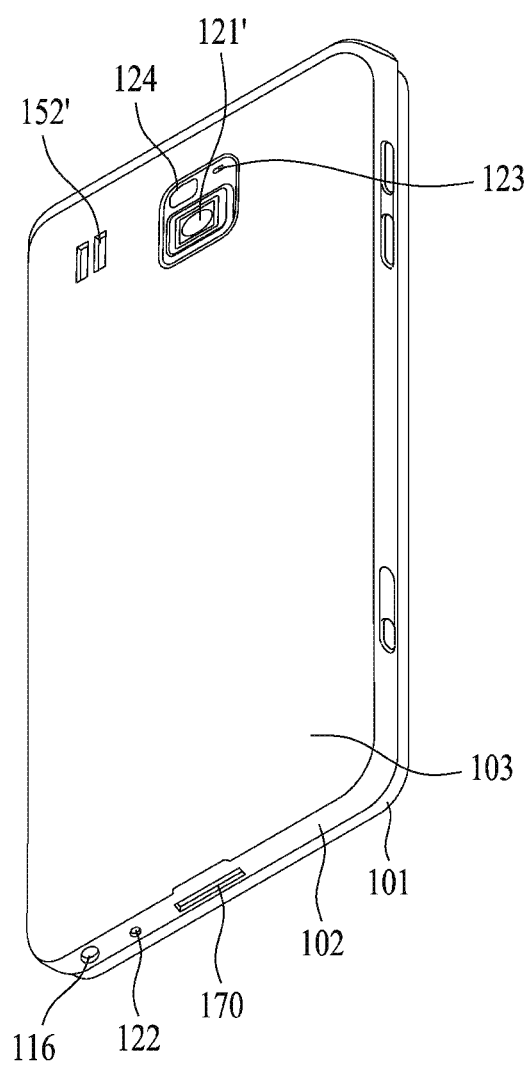

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

For instance, the wireless communication unit 110 typically includes one or more components which permit wireless communication between the mobile terminal 100 and a wireless communication system or network within which the mobile terminal is located. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

The controller 180 may provide or process information or functions appropriate for a user by processing signals, data, information and the like, which are input or output by the various components depicted in FIG. 1A, or activating application programs stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Further preferred embodiments will be described in more detail with reference to additional drawing figures. It is understood by those skilled in the art that the present features can be embodied in several forms without departing from the characteristics thereof.

Figure 2:
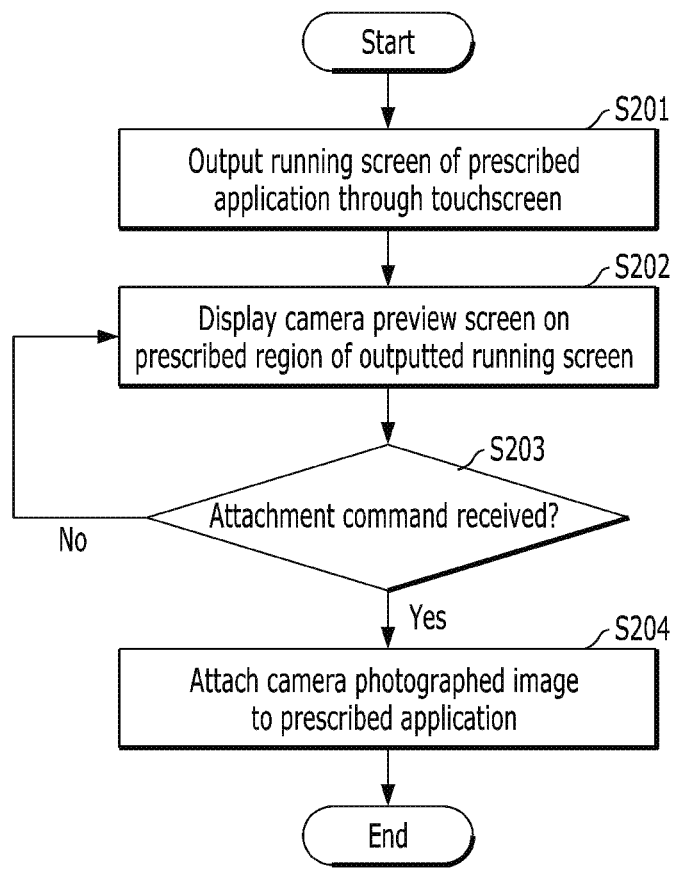
FIG. 2 is a flowchart for a control method of easily attaching an image data photographed through a camera according to one embodiment of the present invention.
Figure 3:
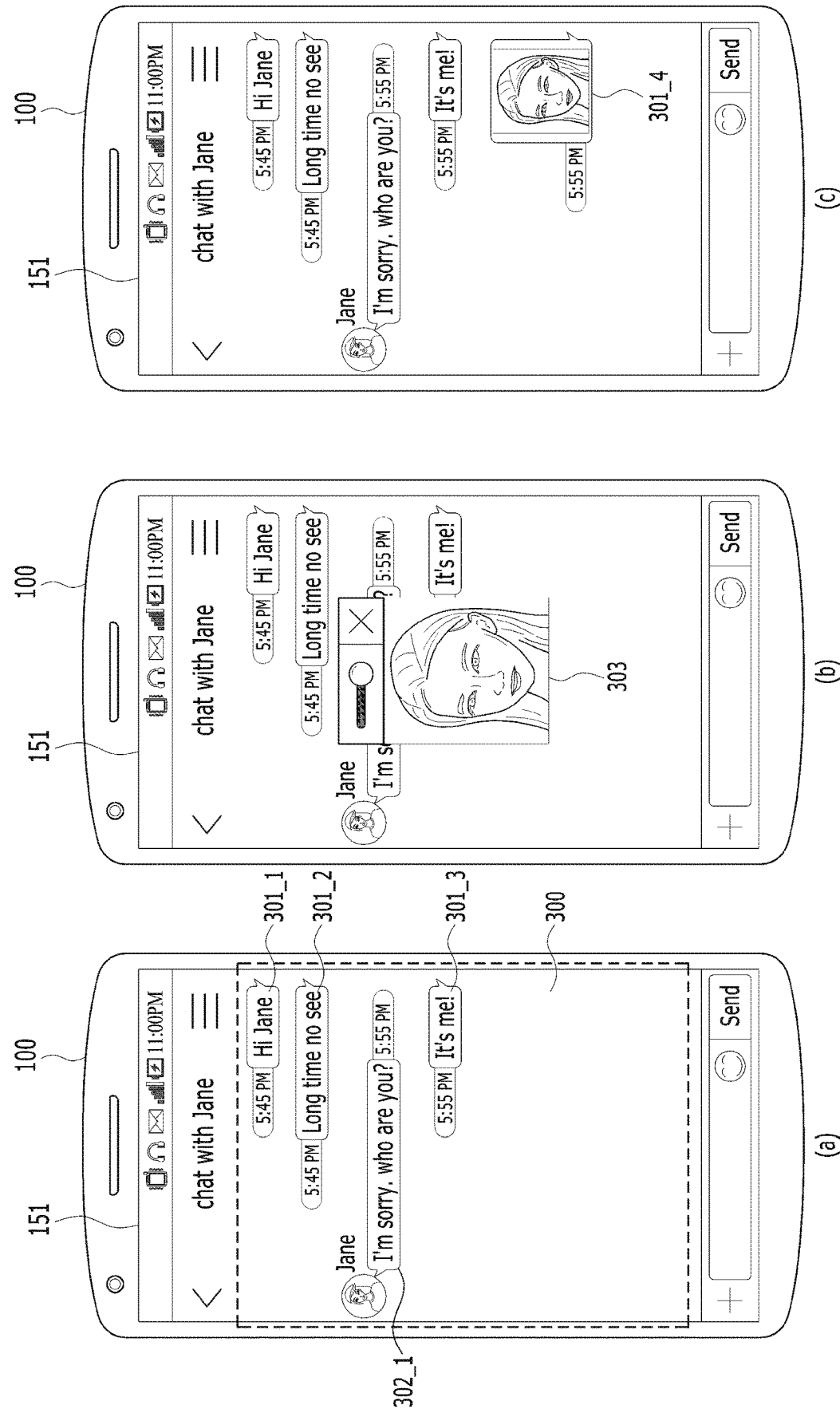
FIG. 3 is a diagram of a configuration for a control method of easily attaching an image data photographed through a camera according to one embodiment of the present invention.

FIG. 2 is a flowchart for a control method of easily attaching an image data photographed through a camera according to one embodiment of the present invention. FIG. 3 is a diagram of a configuration for a control method of easily attaching an image data photographed through a camera according to one embodiment of the present invention. The following description is made with reference to FIG. 2 and FIG. 3.

In a step S201, the controller 180 outputs a running screen of a prescribed application through the touchscreen. Referring to FIG. 3 (a), for example of the running screen, the mobile terminal 100 currently outputs a running screen of an SNS (social network service) application (hereinafter named a message transceiving application) capable of transceiving a message. The message transceiving application is the application capable of transceiving text, image and/or audio data with at least one receiving counterpart and is able to transceive such data using the wireless communication unit 110.

The running screen of the message transceiving application (i.e., example) is described in detail with reference to the running state diagram shown in FIG. 3 (a) as follows. According to the example shown in FIG. 3, a user of the mobile terminal currently transceives messages with a counterpart 'Jane'. This running screen includes a transceiving record region 300 through which transceived messages are outputted. Regarding the transceiving record region 300, left-sorted messages 302-1 include the messages (hereinafter named received messages) received from a counterpart terminal by the mobile terminal 100, while right-sorted messages 301-1 to 301-3 include the messages (hereinafter named sent messages) sent to the counterpart terminal by the mobile terminal 100. On the running screen of the message transceiving application mentioned in the detailed description of the present invention, the sent messages may be indicated by the reference numbers 301-1, 301-2 . . . and the received messages may be indicated by the reference numbers 302-1, 302-2 . . . .

In a step S202, the controller 180 can display a preview screen of the camera on a prescribed region of the outputted running screen. Referring to FIG. 3(b), the preview screen is outputted as a popup window 303 (hereinafter named a preview popup window). In this case, the preview popup window 303 is outputted to a prescribed region on the running screen of the prescribed application.

According to one embodiment of the present invention, the preview popup window 303 is proposed to be always outputted to the touchscreen 151 as if floating on the touchscreen 151 irrespective of an output of a running screen of another application. For instance, a physical layer for controlling an output of the preview popup window 303 is proposed to be implemented not one an application stage but on a framework stage. Hence, although the preview popup window 303 is floating, a running screen of another application can perform an operation (e.g., an output of information and/or an input of a touch gesture, etc.) irrespective of the output of the preview popup window 303.

According to one embodiment of the present invention, proposed is a method of attaching image data to a prescribed application easily. Generally, in order to attach image data to a prescribed application, if a camera activation command is received, a camera preview screen is outputted by being switched from a currently outputted running screen of an application. Subsequently, after a photo has been photographed, the camera preview screen is switched to the previously outputted running screen of the application and the photographed image data is then attached. In this process, the application previously run before the camera activation may be temporarily run on a background or the output of the running screen of the application previously run before the camera activation may be temporarily paused.

Hence, according to one embodiment of the present invention, it is proposed in detail that a preview screen of a camera is outputted to a prescribed region of a running screen of a previously outputted application while the corresponding running screen is outputted intactly. Moreover, if a prescribed command is received, an image is photographed through the camera and the photographed image data is directly attached to the corresponding application.

In a step S203, the controller 180 waits for a reception of an attachment command from a user. In this case, the attachment command means a command, which is received from the user, for photographing an image through the activated camera and attaching the photographed image data to the application in direct. If the attachment command is not received in the step S203, the controller 180 can return to the step S202. If the attachment command is received in the step S203, the controller 180 goes to a step S204.

In the step S204, the controller 180 can attach the image data photographed through the camera to the prescribed application.

Moreover, according to one embodiment of the present invention, if the prescribed application is a message transceiving application, the controller 180 can control the wireless communication unit 110 to directly send the attached image data. In particular, according to this embodiment, when the user intends to send the photographed image data to a message receiving counterpart, the user can send an image in a manner of attaching the image simply and easily using a one-time attachment command [Direct Attachment].

Since the image data directly photographed through the camera is attached, it may be attached (attached and then sent in the message transceiving application) without being checked by a user. If so, although an undesired image data is photographed, the corresponding image data may be attached (sent) in the message transceiving application. In a step S204 according to another embodiment of the present invention, in response to the reception of the attachment command, after a popup window for checking whether to send the photographed image data has been outputted, if a user inputs a command for confirming whether to attach through the popup window, the photographed image data is proposed to be attached. In case of not intending to send the photographed image data, a cancellation may be made through the popup window [Attachment after Check].

According to one embodiment of the present invention, the controller 180 may be able to distinguish the operation 'Direct Attachment' from the operation 'Attachment after Check' through a user command by combining the above two embodiments together. In particular, if a $1^{st}$ command is received, the controller 180 performs a photographing and is then able to directly attach the photographed image data to an application. If a $2^{nd}$ command is received, the controller 180 outputs a popup window for attaching an image data photographed through the camera. If a conformation command is received through the outputted popup window, the controller 180 can attach the photographed image data to an application. For example, the $1^{st}$ command may include a double touch (i.e., a short touch applied twice in a prescribed time) received through the preview popup window 303. For example, the $2^{nd}$ command may include a short touch received through the preview popup window 303.

Figure 7:
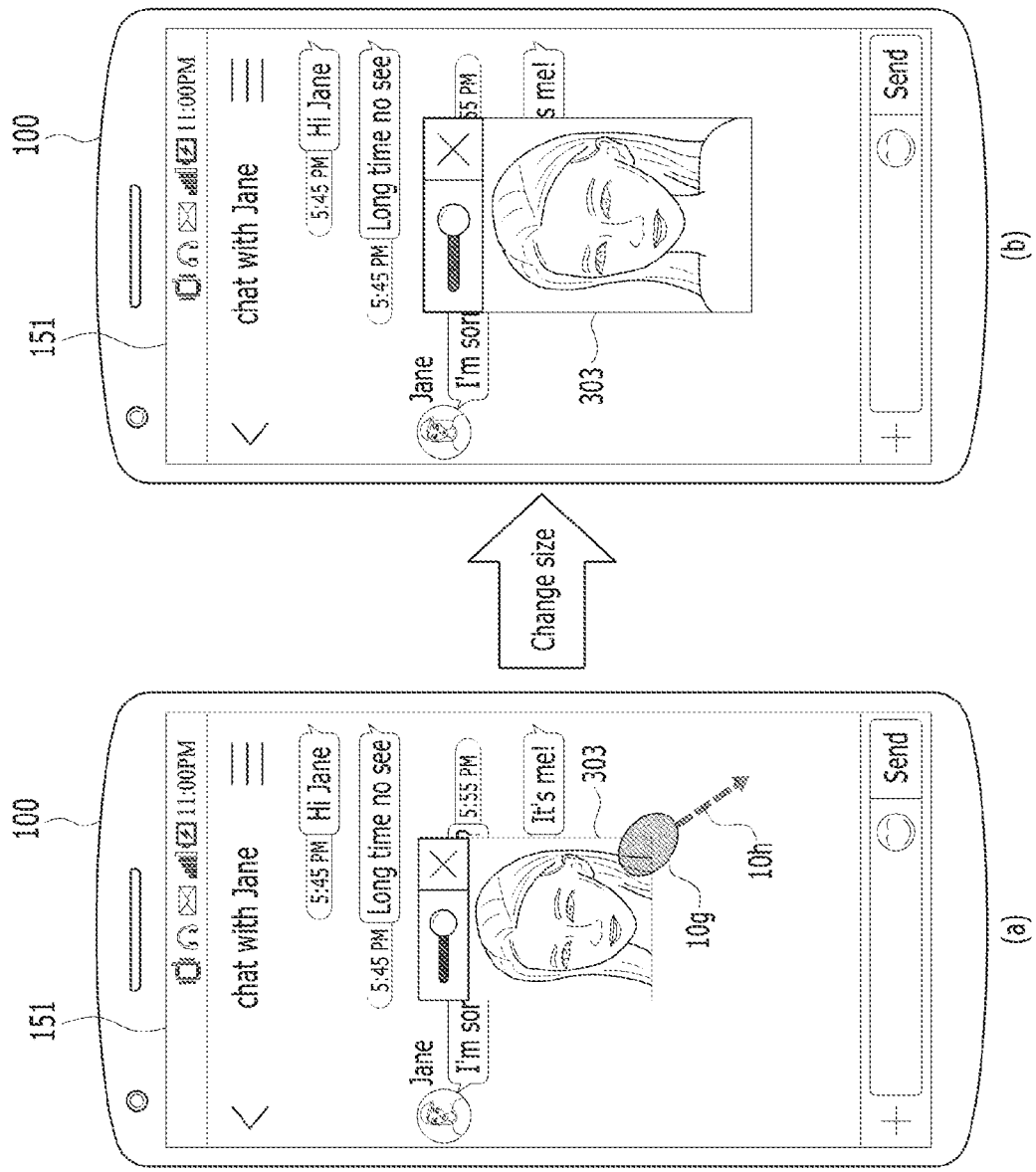
Figure 8:
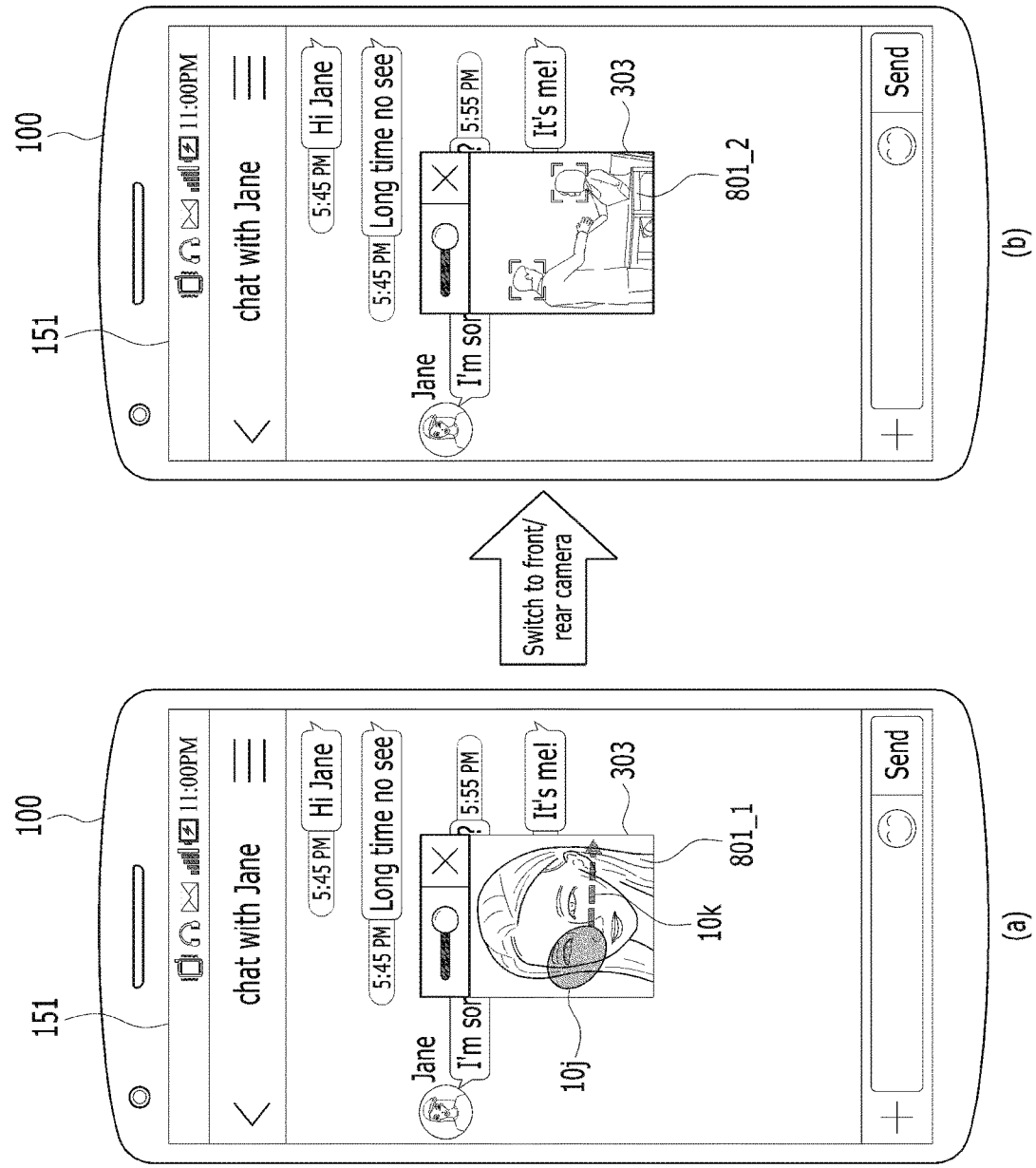
Figure 9:
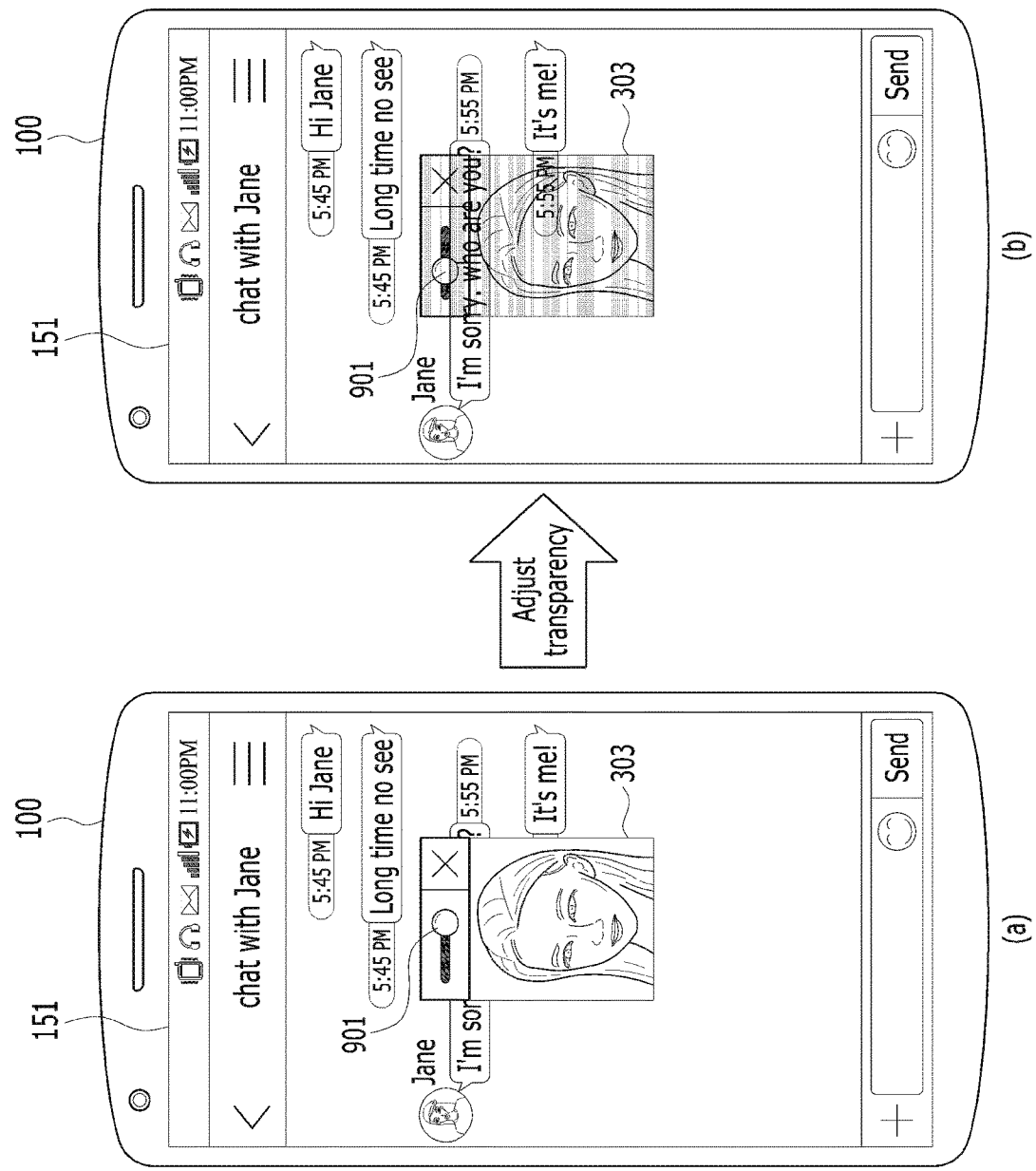

Meanwhile, according to one embodiment of the present invention, in performing the attachment operation in the step S204, it is proposed to change a size of image data, which is to be attached, based on a size of the preview popup window 303. This shall be described with reference to FIG. 7 later. In response to a user's command or a prescribed condition, the controller 180 can change a size of the preview popup window 303. In response to the reception of the attachment command, if a size of the preview popup window 303 is a $1^{st}$ size, the controller 180 changes a data size of image data, which is to be attached, into a $1^{st}$ data size. In response to the reception of the attachment command, if a size of the preview popup window 303 is a $2^{nd}$ size, the controller 180 changes a data size of image data, which is to be attached, into a $2^{nd}$ data size.

FIG. 3(c) shows a running screen to which a photographed image data is attached. Referring to FIG. 3(c), an attached image data is sent and a sent message 301-4 having the image data attached thereto is displayed on the transceiving record region 300.

Meanwhile, the above-mentioned embodiment is described by taking the message transceiving application as an example, by which the present invention is non-limited. And, the above-mentioned embodiment is applicable to applications of various types. In particular, an embodiment of the present invention is applicable to an application capable of a copy operation on an image data and a paste operation on the copied image data.

Aside from the above-mentioned examples of the applications, other examples to which one embodiment of the present invention is applicable are described as follows.

(1) Address book (contact) application—if an attachment command is received on an address book application, the controller 180 photographs a photo and is then able to directly attach the photographed image data as an image on a prescribed address book (contact) item. Alternatively, if a prescribed face is included in an image data photographed on an address book (or contact) application, the controller 180 searches an address book based on the identified corresponding face and is then able to provide a user with a found result.

(2) Map application—if an attachment command is received on a map application, the controller 180 photographs a photo and is then able to save an image data of the photographed photo as an image data corresponding to a prescribed location on a map. In this case, the image data corresponding to the prescribed location may mean an image displayed in a pin shape at the prescribed location when a user reads the corresponding map in the future.

(3) Email application—Like a message transceiving application, the controller 180 can attach a photographed image data to an email composed for a receiving counterpart.

(4) Video play application—if an attachment command is received in the course of playing a video, the controller 180 can attach (or save) a photographed image data in form a clip image data for a play timing point.

(5) Gallery application—If an attachment command is received, the controller 180 can control a photographed image data to be saved in the corresponding gallery application. Particularly, if a storage structure of an image data in the gallery application is a folder type, if an attachment command is received through a corresponding folder, the controller 180 can save the photographed image data in the corresponding folder by changing a storage path. Alternatively, if an attachment command is received, the controller 180 searches images in the gallery application using the photographed image data and is then able to provide a found result. In this case, if a face is included in the photographed image data, the controller 180 may search for the image including the corresponding face or perform the search using information on a location at which the corresponding image data was photographed.

(6) Memo application—If an attachment command is received, the controller 180 photographs a photo through the camera and is then able to directly attach an image data of the photographed photo to the memo application. The attached image data is handled like a single text and can be deleted by a key button input (e.g., a backspace button input) for deleting letters.

(7) Calendar application—If an attachment command is received, the controller 180 photographs a photo through the camera and is then able to add an image data of the photographed photo to a schedule.

(8) Music play application—If an attachment command is received, the controller 180 can set a cover photo of a currently played music. If an album image included in an image data of a photographed photo is recognized, the controller 180 can search for a music and/or album using the recognized album image.

(9) Search application (or, a case of accessing a search site on a web browsing application)—If an attachment command is received, the controller 180 attaches an image data of a photographed photo to the search application and is able to control a search to be performed using the attached image data.

(10) Other applications—If an attachment command is received, the controller 180 can output a popup for sharing an image data of a photographed photo.

Meanwhile, in the aforementioned step S202, the controller 180 outputs the preview popup window 303 of the camera. Although the preview popup window 303 can be outputted by the controller 180 under a prescribed condition, it is proposed to be outputted in response to a user command according to one embodiment of the present invention. One example of a user command for outputting the preview popup window 303 is described in detail with reference to FIG. 4 and FIG. 5 as follows.

Figure 5:
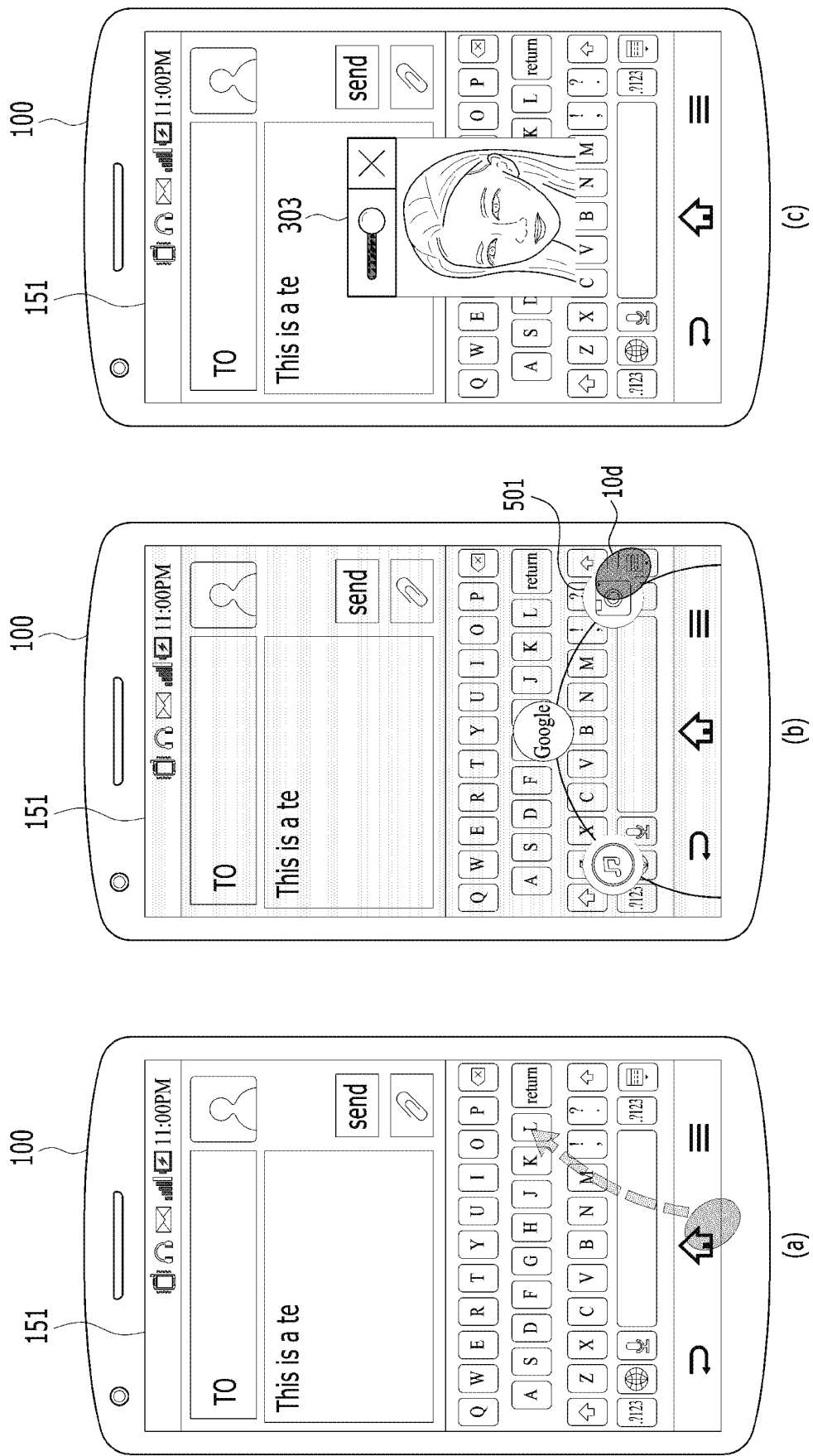
Figure 6:
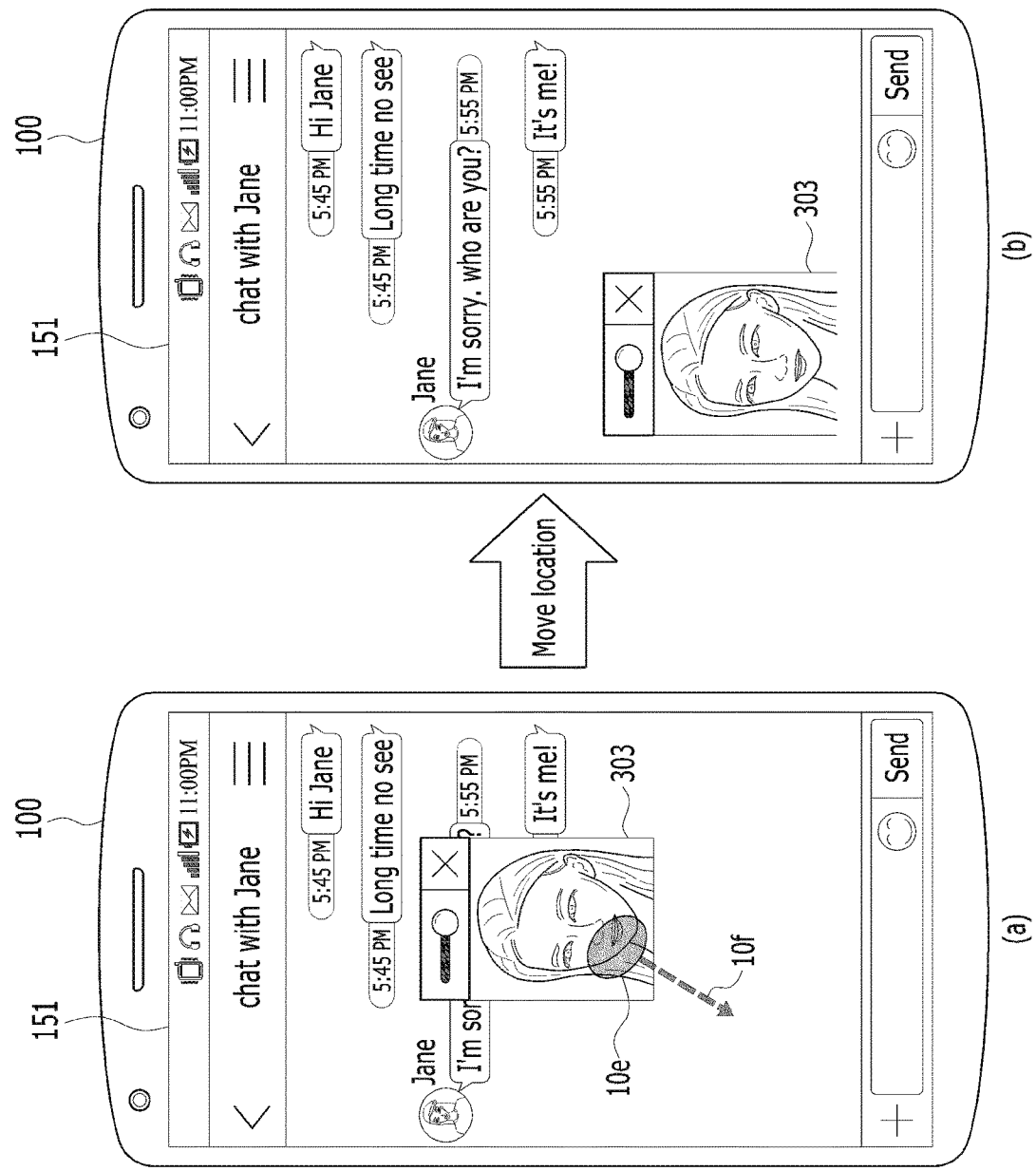
FIGS. 6 to 9 are diagrams for a method of controlling a preview popup window 303 according to one embodiment of the present invention.

FIG. 4 and FIG. 5 are diagrams for examples of a user command for outputting a camera preview popup window 303 according to one embodiment of the present invention.

FIG. 4(a) is a diagram for a configuration of outputting a home screen. The home screen is described in detail as follows. First of all, the home screen can be defined as a screen initially displayed on the touchscreen when a locked state of the touchscreen 151 is unlocked. And, at least one icon or widget for running an application or an internal function may be displayed on the displayed screen. At least two home screens may exist in the mobile terminal 100 as well as one home screen. In this case, when a prescribed touch gesture is applied to the touchscreen 151, the at least two home screens can be sequentially displayed one by one. And, different icons (widgets) may be disposed on the home screens, respectively. According to one embodiment of the present invention, the controller 180 outputs an icon (hereinafter named a fast photograph icon) 401 for outputting a preview popup window 303 to the home screen and is then able to output the preview popup window 303 in response to an input 10a of selecting the fast photograph icon 401.

Meanwhile, according to the above-described method, it is not easy to output the preview popup window 303 in the course of outputting a running screen of an application. The reason for this is that the fast photograph icon 401 should be selected after switching to the home screen again in the course of outputting the running screen of the application. Therefore, according to another embodiment of the present invention, further proposed is a control method of outputting a preview popup window 303 on a running screen of an application. Such an embodiment is described in detail with reference to FIG. 5 as follows.

Referring to FIG. 5(a), the controller 180 currently outputs a running screen of a text message sending application through the touchscreen 151. According to one embodiment of the present invention, in response to a prescribed input received from a user, it is proposed to output a preview popup window 303 through a function (i.e., a quick launcher function, cf. FIG. 5(b)) of outputting at least one run icon. A user input for paging the quick launcher function may include an input performed in a manner of touching a home button 10b and then applying a drag 10c in a prescribed direction by maintaining the touch. If the user input for paging the quick launcher function is received, referring to FIG. 5(b), the controller 180 can output at least one icon including a fast photograph icon 501.

If an input for selecting the fast photograph icon 501 is received in FIG. 5(b), referring to FIG. 5(c), the controller 180 can output a preview popup window 303.

The control method for paging the preview popup window 303 is described in detail with reference to FIG. 4 and FIG. 5. In the following description, a control method of controlling a preview popup window 303 after outputting the preview popup window 303 is described in detail with reference to the accompanying drawings.

FIGS. 6 to 9 are diagrams for a method of controlling a preview popup window 303 according to one embodiment of the present invention.

According to one embodiment of the present invention, it is proposed that a location, size and/or transparency of the preview popup window 303 can be adjusted. Since the preview popup window 303 should be outputted to a prescribed region of a running screen of another application, the preview popup window 303 may block an output of the running screen of the another application in part or interrupt the output of the running screen of the another application. Moreover, according to one embodiment of the present invention, if the mobile terminal includes a plurality of cameras, a method of facilitating a plurality of the cameras to be switched to one another is proposed.

Referring to FIG. 6(a), a preview popup window 303 is currently outputted through a running screen of a message transceiving application. According to one embodiment of the present invention, if a user command (hereinafter named a movement command) for moving a location of the preview popup window 303 is received, the controller 180 can control the touchscreen 151 to output the preview popup window 303 in a manner of changing a location of the currently outputted preview popup window 303.

For example, after an input of applying a touch 10e to the outputted preview popup window 303 has been received, the movement command may include an input of applying a drag 10f to a desired location by maintaining the touch 10e.

FIG. 6(b) is a diagram for a configuration of outputting the preview popup window 303 shown in FIG. 6(a) by moving the preview popup window 303 in response to the movement command.

Meanwhile, according to one embodiment of the present invention, if a location of the preview popup window 303 is moved to a prescribed corner of the touchscreen 151, it is further proposed to control the preview popup window 303 to be displayed as a reduced icon.

Referring to FIG. 7(a), a preview popup window 303 is currently outputted through a running screen of a message transceiving application. According to one embodiment of the present invention, if a user command (hereinafter named a size adjustment command) for adjusting a size of the preview popup window 303 is received, the controller 180 can control the touchscreen 151 to output the preview popup window 303 in a manner of changing a size of the currently outputted preview popup window 303.

For example, after an input of applying a touch 10g to the outputted preview popup window 303 has been received, the size adjustment command may include an input of applying a drag 10h to a desired location by maintaining the touch 10g.

FIG. 7(b) is a diagram for a configuration of outputting the preview popup window 303 shown in FIG. 7(a) by adjusting to increase the size of the preview popup window 303 in response to the size adjustment command.

Referring to FIG. 8(a), a preview popup window 303 is currently outputted through a running screen of a message transceiving application. According to one embodiment of the present invention, when the mobile terminal 100 includes a plurality of cameras, if a camera switching command is received, the controller 180 can control a preview screen, which is currently outputted through the preview popup window 303, to be switched to a preview screen of another camera. In particular, while a preview screen 801-1 of a 1$^{st}$ camera is outputted, if a camera switching command is received, the controller 180 can control a preview screen 801-2 of a 2$^{nd}$ camera to be outputted.

For example, the camera switching command may include an input of applying a flicking 10j and 10k to the outputted preview popup window 303.

FIG. 8(b) is a diagram for a configuration of outputting the preview popup window 303 by switching the camera outputting the preview popup window 303 shown in FIG. 8(a) to another camera in response to the camera switching command.

Referring to FIG. 9(a), a preview popup window 303 is currently outputted through a running screen of a message transceiving application. According to one embodiment of the present invention, if a user command (hereinafter named a transparency adjustment command) for adjusting a transparency of the preview popup window 303 is received, the controller 180 can control the touchscreen 151 to output the preview popup window 303 in a manner of changing a transparency of the currently outputted preview popup window 303.

For example, the transparency adjustment command may include an input of adjusting a transparency adjustment bar. According to one embodiment of the present invention, in order to adjust a transparency of the preview popup window 303, it is proposed to further output a transparency adjustment bar and a transparency adjustment object 901. And, it is also proposed to control the transparency by moving a location of the transparency adjustment object 901 on the transparency adjustment bar. For example, a control command for controlling the location of the transparency adjustment object 901 may include an input of receiving an input of applying a touch to the outputted transparency adjustment object 901 and then applying a drag to a desired location by maintaining the touch.

FIG. 9(b) is a diagram for a configuration of outputting the preview popup window 303 shown in FIG. 9(a) by adjusting to increase the transparency of the preview popup window 303 in response to the transparency adjustment command.

Meanwhile, according to one embodiment of the present invention, an image data photographed through a camera is controlled to be automatically cropped in response to a location and/or size of a preview popup window 303. An operation of cropping an image means an operation of separately designating (or, selecting) a prescribed region desired by a user (or, determined on a prescribed condition) in a full image. In particular, a user may be able to save and/or use an image data in a designated region of a full image by a crop operation.

FIG. 10 is a diagram for a control method of performing an auto-crop operation based on a location and/or size of a preview popup window 303 according to one embodiment of the present invention. Referring to FIG. 10(a), a preview popup window 303 is currently outputted through a running screen of a message transceiving application. The preview popup window 303 is outputted through a prescribed region of the full running screen of the application (or, a full output region of the touchscreen). According to one embodiment of the present invention, it is proposed to crop a portion of a whole camera image received through the camera in order to correspond to an output region of the preview popup window 303 in the full output region of the touchscreen. In particular, referring to FIG. 10(b), it is able to create a 1$^{st}$ auto crop image 1002-1 in order for a full touchscreen output region and an output region of the preview popup window 303 to correspond to a full camera image 1001 and the 1$^{st}$ auto crop image 1002-1, respectively.

FIG. 10(c) is a diagram for a configuration that a location of the preview popup window 303 shown in FIG. 10(b) is changed. If an attachment command is received, it is able to crop a 2$^{nd}$ auto crop image 100-2 in a manner of photographing an image automatically through the camera and then cropping the photographed full camera image 1001. In particular, the 2$^{nd}$ auto crop image 100-2 is cropped to correspond to the moved location of the preview popup window 303.

Meanwhile, an image data attached (or sent) by a control method according to one embodiment of the present invention can be controlled to be directly deleted without being saved separately. Yet, it is apparent to those skilled in the art that the photographed image data can be temporarily saved in order to be attached to an application. Yet, according to one embodiment of the present invention, the object is to photograph and attach (or send) a photographed image data quickly rather than to save.

A control method according to another embodiment of the present invention proposes that an attached (sent) image data is saved in a separate folder (or, identified) on a gallery application. Such an embodiment is described in detail with reference to FIG. 11 as follows.

Figure 11:
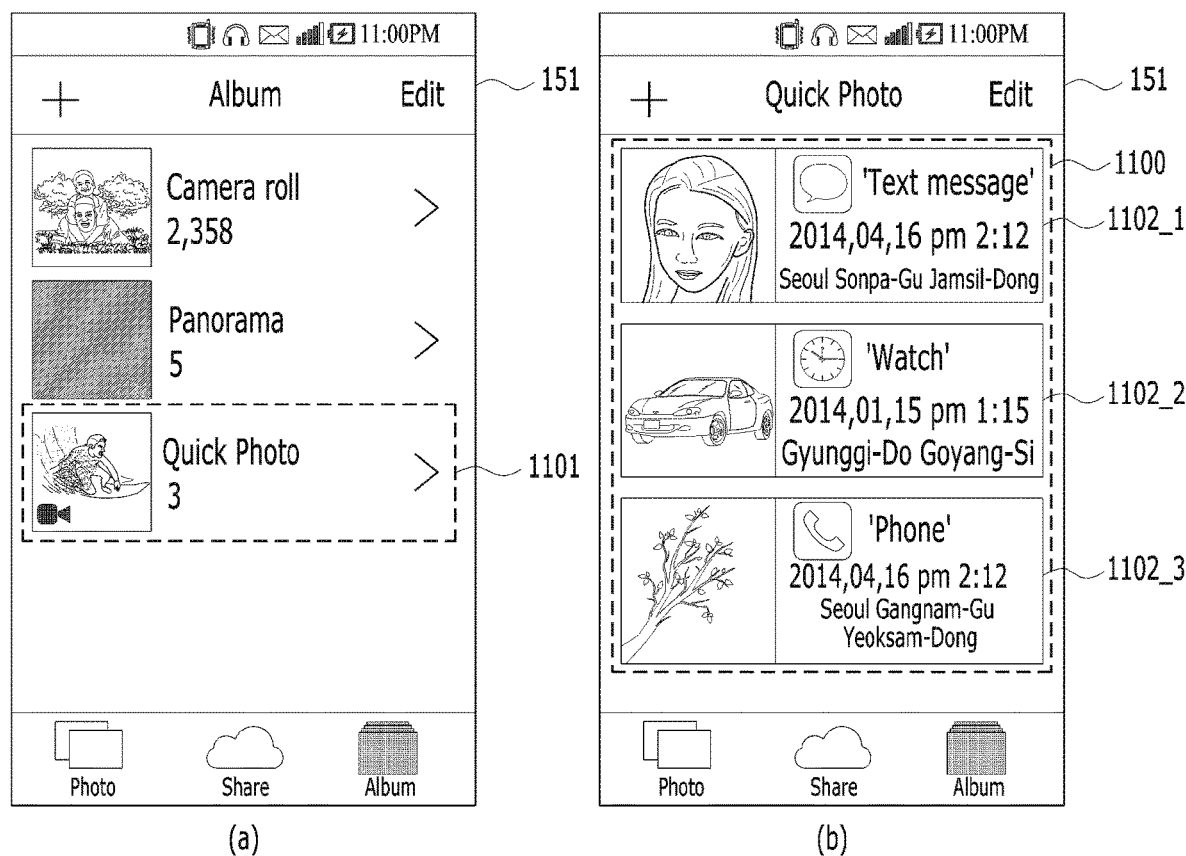
FIG. 11 is a diagram for a control method of sorting and keeping image data attached to a prescribed application in a separate folder according to one embodiment of the present invention.

FIG. 11 is a diagram for a control method of sorting and keeping image data attached to a prescribed application in a separate folder according to one embodiment of the present invention. Referring to FIG. 11(a), a configuration of running a gallery application is illustrated. This configuration includes 3 image folders 'camera roll', 'panorama' and 'photo'. According to one embodiment of the present invention, the controller 180 is proposed to sort and keep the data attached (sent) by the aforementioned embodiment in the quick photo folder 1101. Meanwhile, a folder name 'quick photo' is just one example, by which the present embodiment is non-limited.

FIG. 11(*b*) is a diagram for a configuration that the quick photo folder 1101 is entered. A list 1100 of image data attached (sent) by the aforementioned embodiment is outputted. The list 1100 shown in the example includes 3 image data items 1102-1 to 1102-3. Each of the image data items can be displayed together with a type of an attached application, an date and hour of the attachment, and/or a location information at a timing point of the attachment.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD(Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a first camera configured to acquire a first preview image;
a touchscreen; and
a controller configured to:
display a running screen of a messaging application on the touchscreen,
display a preview window together with the running screen of the messaging application,
wherein a first region of the first preview image received through the first camera is displayed in the preview window, the first region being determined from the first preview image based on a size of the preview window, and wherein the preview window is resizable in response to a size change command, and
in response to an attachment command, automatically crop the first region of the first preview image, and attach an image of the cropped first region to the messaging application.

2. The mobile terminal of claim 1, wherein the controller is further configured to:
resize the preview window based on the size change command,
display a second region of the first preview image in the resized preview window, the second region being determined from the first preview image based on a size of the resized preview window, and
in response to another attachment command, automatically crop the second region of the first preview image and attach an image of the cropped second region to the messaging application.

3. The mobile terminal of claim 1, wherein a remaining region of the first preview image is not displayed on the touchscreen.

4. The mobile terminal of claim 1, wherein the size change command comprises a touch and drag input to the preview window.

5. The mobile terminal of claim 1, wherein the size of the preview window is adjustable based on a touch and drag input.

6. The mobile terminal of claim 1, wherein a data size of the attached image is based on the size of the preview window.

7. The mobile terminal of claim 1, further comprising a transceiver, wherein the controller is further configured to send the attached image to a counterpart via the transceiver.

8. The mobile terminal of claim 1, wherein the controller is further configured to store the image of the first region to be associated with an image gallery application.

9. The mobile terminal of claim 1, further comprising a second camera configured to acquire a second preview image, wherein the controller is further configured to:
in response to a camera switching command, display a third region of the second preview image received through the second camera in the preview window, the third region being determined from the second preview image based on the size of the preview window, and
in response to another attachment command, automatically crop the third region of the second preview image and attach an image of the cropped third region to the messaging application.

10. The mobile terminal of claim 1, wherein the attachment command comprises a double touch input to the preview window.

11. The mobile terminal of claim 1, wherein the controller is further configured to:
move the preview window based on a movement command,
display a fourth region of the first preview image in the moved preview window, the fourth region being determined from the first preview image based on a location of the moved preview window, and
in response to another attachment command, automatically crop the fourth region of the first preview image and attach an image of the cropped fourth region to the messaging application.

12. The mobile terminal of claim 1, wherein the controller is further configured to display the first region of the first preview image based on a location of the preview window.

13. The mobile terminal of claim 1, wherein the controller is further configured to:
in response to an input to a specific button displayed together with the running screen of the message application, display at least one icon including a photograph icon, wherein the first preview image is displayed in the preview window in response to an input to the displayed photograph icon.

14. A method of controlling a mobile terminal, comprising:
acquiring a first preview image via a first camera;
displaying a running screen of a messaging application on a touchscreen;
displaying a preview window together with the running screen of the messaging application on the touchscreen;
wherein a first region of the first preview image received through the first camera is displayed in the preview window, the first region being determined from the first preview image based on a size of the preview window, and wherein the preview window is resizable in response to a size change command, and
in response to an attachment command, automatically cropping the first region of the first preview image, and attaching an image of the cropped first region to the messaging application.

15. The method of claim 14, further comprising:
resizing the preview window based on the size change command;
displaying a second region of the first preview image in the resized preview window, the second region being determined from the first preview image based on a size of the resized preview window; and
in response to another attachment command, automatically crop the second region of the first preview image and attach an image of the cropped second region to the messaging application.

16. The method of claim 14, wherein a remaining region of the first preview image is not displayed on a touchscreen.

17. The method of claim 14, wherein the size change command comprises a touch and drag input to the preview window.

18. The method of claim 14, wherein a data size of the attached image is based on the size of the preview window.

19. The method of claim 14, further comprising:
acquiring a second preview image via a second camera;
in response to a camera switching command, displaying a third region of the second preview image received through the second camera in the preview window, the third region being determined from the second preview image based on the size of the preview window; and
in response to another attachment command, automatically cropping the third region of the second preview image and attaching an image of the cropped third region to the messaging application.

20. The method of claim 14, further comprising:
moving the preview window based on a movement command,
displaying a fourth region of the first preview image in the moved preview window, the fourth region being determined from the first preview image based on a location of the moved preview window, and
in response to another attachment command, automatically cropping the fourth region of the first preview image and attaching an image of the cropped fourth region to the messaging application.

* * * * *